Patented Mar. 13, 1928.

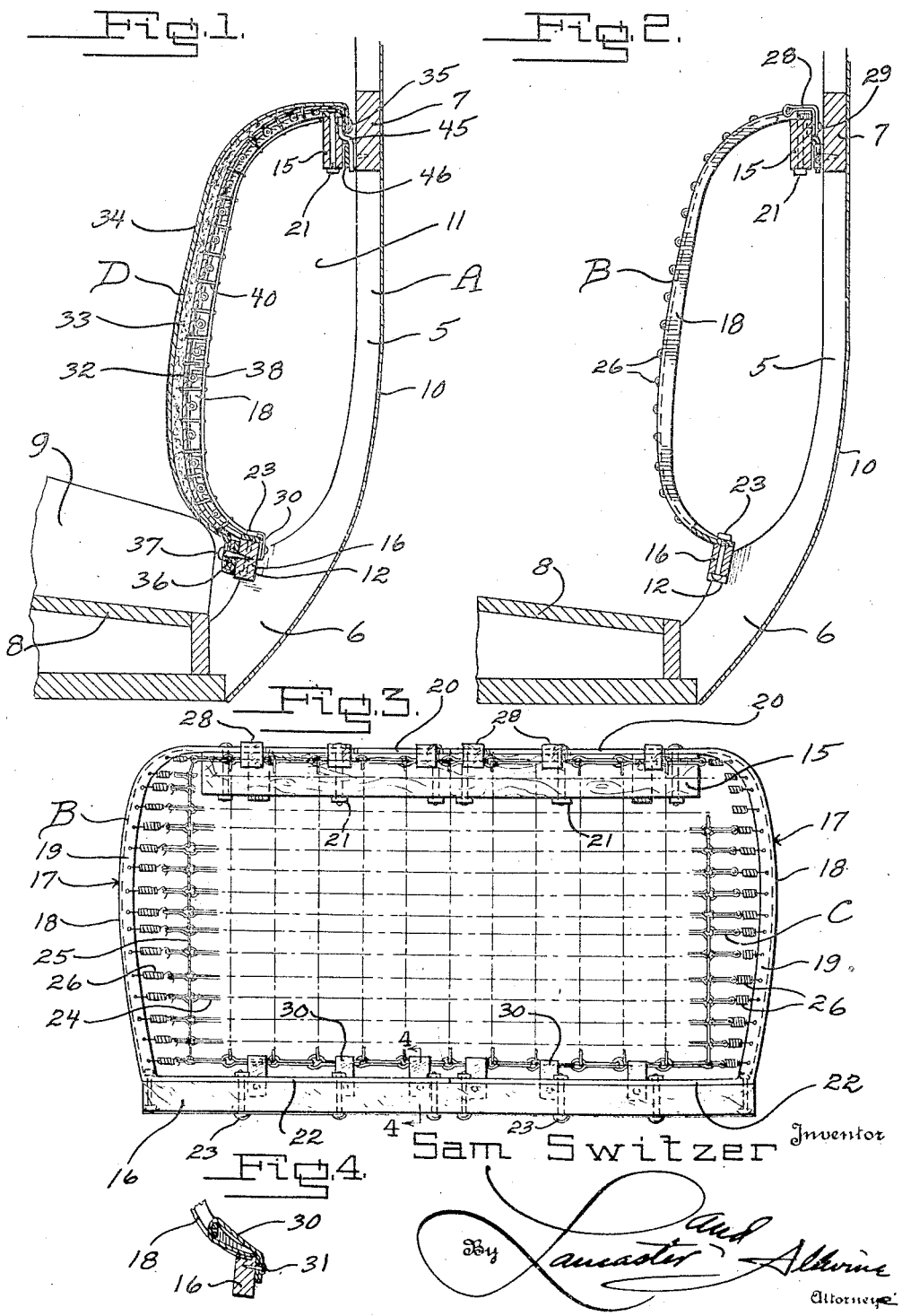

1,662,216

UNITED STATES PATENT OFFICE.

SAM SWITZER, OF CASPER, WYOMING.

BACK CUSHION FOR VEHICLE SEATS.

Application filed December 16, 1926. Serial No. 155,254.

The present invention relates to passenger motor vehicles, and more specifically to improvements in back cushions for vehicles of the aforesaid type.

The primary object of the invention is to provide an improved back cushion for passenger vehicles embodying resilient features, and which cushion is of such construction as to provide a compartment for receiving a considerable amount of luggage.

A further object of the invention is to provide an improved back cushion construction which is of such construction as to eliminate the ordinary bulky construction of the usual type of back cushions employing spiral springs, and which back cushion may be readily substituted for the spiral spring type of back cushions as now in common use.

A still further object of the invention is to provide a back cushion construction for passenger vehicle seats wherein increased storage space is available, and which cushion is readily removable from the vehicle body construction for permitting of access being had to the storage space provided at the rear of the cushion.

Briefly, the invention resides in the provision of a frame so shaped as to conform to the outline of an ordinary back seat cushion, and which frame is adapted to support a substantially flat resilient mat over which the upholstering is applied.

Other objects and advantages of the invention will be apparent during the course of the following detailed description, taken in connection with the accompanying drawing forming a part of this specification and in which drawing:

Figure 1 is a vertical sectional view though a back cushion constructed in accordance with my invention and showing the same in position upon a conventional type of vehicle body construction for forming the back cushion for the vehicle seat.

Figure 2 is an end elevation of the supporting frame for the cushion and showing sections broken away at the upper and lower edges thereof for illustrating certain details of construction.

Figure 3 is a plan view of the outer or face side of the supporting frame for the cushion.

Figure 4 is a fragmentary section on line 4—4 of Figure 3.

Referring to the drawing in detail, and wherein similar reference characters designate corresponding parts throughout the several views, the letter A may designate a conventional type of passenger vehicle body construction for illustrating by way of example, one method whereby the improved back cushion may be supported for forming the storage space, the improved back cushion comprising a frame B and a resilient support C over which is applied the upholstering material D.

In the example shown, the back cushion has been shown as forming the back of the rear seat of a passenger automobile.

The vehicle body construction A and which is of ordinary construction, embodies the usual rear pillars 5 having forwardly curved deck portions 6 at their lower ends, and connecting the pillars 5 above the deck 6, is a horizontally disposed belt rail 7. Arranged forwardly of the lower end of the pillars 5, is the usual rear seat frame 8 for supporting of a seat cushion 9. Extending over the rear side of the pillars 5, is the usual metal panel 10, and it is between this panel 10 and the improved back cushion that a compartment 11 is provided for storage purposes. Provided in the forward edges of each of the deck portions 6 of the pillars 5, are L-shaped seats 12, and which seats provide rests for the lower edges of the ordinary type of back cushions employing coil springs for cushioning means.

Referring now to the frame B, and which is constructed of metal and wooden sections, the same embodies a pair of upper and lower wooden rails 15 and 16 respectively, and a pair of similarly formed metal carriers 17 of substantially U-shape in formation, and which connect the ends of the wooden rails 15 and 16 for forming the rectangular shaped supporting frame B. Each of the metal carriers 17 embodies an angle shaped end portion 18 having the flange 19 thereof arranged at the front face of the frame and extending inwardly thereof. These angular end portions 18 have their upper and lower ends extending rearwardly as will be observed in Figure 2, and in front elevation are curved outwardly intermediate their ends as in Figure 3 for causing the ends of the frame to conform to the shape of the end cushions of the vehicle seat. Extending inwardly from the upper end of each end portion 18, are flat upper strip sections 20 which extend across the upper face of the top rail 15 and are secured to the rail 15 as by means of suitable bolts or other fastening elements 21. These flat strip sections 20 preferably abut at the longitudinal center of the rail 15 and are preferably of a width equal to the thickness of the rail 15. Extending inwardly from the lower end of the end portions 18, are flat lower strip sections or arms 22 which extend across the upper face of the lower rail 16 and are secured to the rail as by means of bolts or other suitable fastening elements 23. These strip sections 22 also preferably abut at the longitudinal center of the lower rail 16.

Referring now to the support or cushioning means C, the same is in the form of a resilient mat embodying a plurality of horizontally connected loops 24 connected at the joints of the loops by a series of vertically extending links 25. These loops 24 and connecting inks 25 may be of any desired length for giving the desired flexibility to the substantially flat mat formed thereby. Connected at each end of the horizontally connected loops 24, is a suitable coil spring 26, the opposite end of the series of coil springs being connected in suitable apertures provided in the flanges 19 of the frame end portions 18. Looped about the uppermost horizontal row of loops 24, is a series of anchoring straps 28 which may be formed of any flexible material such as canvas or the like, and which straps are trained over the upper edge of the frame and secured to the back face of the upper wooden rail 15 as by suitable fastening elements 29 which may be in the form of tacks or nails driven into the wooden rail 15. Looped about the lowermost horizontal line of loops 24, is a series of flexible anchoring straps 30 which preferably extend across the upper side of the lower rail 16 and have their ends secured to the rear face of the wooden rail 16 as by means of suitable fastening elements 31 driven through the ends of the straps and into the rail 16. This anchoring of the upper and lower edges of the mat to the upper and lower rails 15 and 16 respectively, serves as a reinforcement for preventing too great distortion of the mat, and also serves for relieving strain upon the upholstering material D.

The upholstering material D for the cushion, embodies a suitable lining 32 which is positioned over the mat formed by the loops and links 24 and 25 respectively, and over which lining a suitable padding 33 is arranged, with the padding 33 covered by a suitable covering 34. At the upper edge of the cushion, the lining 32 and covering 34 are drawn over the top rail 15 and tacked to the rear face of the wooden rail as by means of suitable fastening elements 35. The lower edge of the lining 32 and covering 34 are folded inwardly upon themselves as at 36 and then secured to the front face of the lower wooden rail 16 as by means of suitable fastening elements 37. At the ends of the cushion, the covering 34 is looped about the frame end portions 18 as at 38 in Figure 1, and extend inwardly past the portions 18 in a manner so that the edges of the covering may be secured to the edge portions of the lining 32 as by means of suitable stitchings 40. It will of course be apparent that the ends 38 of the covering 34 may be anchored to the frame end portions 18 in any suitable manner and not necessarily by means of stitching the ends to the lining 32 as illustrated. It will be seen that the upper and lower wooden rails 15 and 16 respectively, aside from serving as stiffening reinforcements for the flat upper and lower strip sections 20 and 22, also serve as means for ready attachment of the upper and lower edges of the lining and covering of the upholstering. It is to be understood also that these upper and lower rails, shown in the drawing as being constructed of wood, may be constructed of any material whatever and that if desired the entire frame for the cushion may be of metal or wood parts assembled or made into one piece.

Carried by the rear face of the upper rail 15, are hooks 45 having offset depending portions which are adapted to engage behind suitable clips 46 secured to the front face of the belt rail 7. These hooks 45 and clips 46 serve as means for detachably securing the cushion at its upper edge to the body construction A.

When the hooks 45 are positioned behind the clips 46, it will be seen that the lower rail 16 rests upon the L-shaped seat 12 with the rear face of the rail 16 bearing against the vertical portion of the seat. By observing Figures 1 and 2, it will be seen that the point of attachment for the upper end of the cushion is disposed rearwardly of the L-shaped seat 12, and which causes the lower portion of the cushion to have a tendency to swing rearwardly and thus retain its position upon the seat 12.

Thus it will be seen that by so constructing the back cushion as set forth, that a relatively large compartment 11 is provided and which affords means whereby increased storage space is available.

From the foregoing description it will be apparent that an improved and novel back cushion construction has been provided for use in connection with passenger motor vehicles, embodying features whereby a resilient back cushion is provided, and which cushion is of such construction as to provide a compartment which may be utilized for storage purposes.

Changes in detail may be made to the specific form of the invention herein shown and described, without departing from the spirit of the invention or the scope of the following claims.

I claim:

1. A back cushion for seats comprising a frame having uprights and rearwardly offset upper and lower portions, a resilient mat secured at its marginal portions to said uprights and upper and lower portions inwardly of the frame, and an upholstering arranged over the face of the mat and secured at its marginal portions to said frame.

2. A back cushion for seats comprising a frame having rearwardly offset upper and lower portions, a flat resilient mat connected at its ends to the vertical end portions of the frame, means for anchoring the top and bottom portions of the mat to the upper and lower portions of the frame, and an upholstering arranged over the face of the mat and secured at its marginal portions to the frame.

3. A back cushion for seats comprising a frame embodying vertical end portions and rearwardly offset upper and lower portions, a flexible mat arranged inwardly of the frame, means resiliently connecting the ends of the mat to the end portions of the frame, means for anchoring the upper and lower portions of the flexible mat to the upper and lower portions of the frame, and an upholstering arranged over the face of the mat and secured at its marginal portions to the frame.

4. In a back cushion for vehicle seats, a frame embodying upper and lower rails connected by vertical end portions extending forwardly of the rails, a flexible mat formed of horizontally connected loops connected by vertically disposed links, coil springs connecting each end of the horizontally connected loops with the vertical end portions of the frame, and anchoring straps looped about the upper and lowermost horizontally connected loops for attachment respectively to the upper and lower rails of the frame.

5. In a back cushion for vehicle seats, a frame embodying upper and lower wooden rails connected at their ends by U-shaped metal carriers embodying end portions of angle shape in formation and flat strip sections extending along and secured to the upper faces of the upper and lower wooden rails, a flexible mat, means yieldably connecting the ends of the mat with one flange of the carrier end portions, and flexible straps connecting the upper and lower margins of the mat to the upper and lower wooden rails respectively.

6. In a seat construction for vehicle bodies, including rear pillars and a horizontal belt rail connecting the pillars, a back cushion comprising a frame embodying upper and lower rails and end portions having rearwardly offset upper and lower ends for disposing the frame at its end portions a substantial distance forwardly of said pillars, a flexible mat secured at its marginal portions to the frame, an upholstering arranged over the face of the mat, and means for detachably connecting the upper portion of the frame to said belt rail with the lower edge of the frame freely engaging the forward edges of the pillars adjacent their lower ends.

7. In a seat construction for vehicle bodies including rear pillars having seats provided in their front edges adjacent the lower ends of the pillars and a horizontal belt rail connecting the pillars above the seat; a back cushion comprising a frame embodying upper and lower rails, U-shape carriers connecting the ends of the upper and lower rails and provided with forwardly arched end portions, a flexible mat mounted inwardly of the marginal edges of the frame, an upholstering material arranged over the face of the mat and secured at its marginal edges to the frame, clips carried by the belt rail at the front face thereof, and hooks embodying rearwardly offset depending portions, carried by the rear face of the upper rail of the frame for detachably engaging behind said clips with the lower rail of the frame resting upon the seat provided at the lower portions of the pillars.

SAM SWITZER.